(12) United States Patent
Fout et al.

(10) Patent No.: US 10,569,305 B2
(45) Date of Patent: Feb. 25, 2020

(54) CLEANING SYSTEM FOR A CENTRIFUGAL DRYER

(71) Applicants: M-I L.L.C., Houston, TX (US);
MANTOVANI & VICENTINI S.R.L., Berra (IT)

(72) Inventors: Gary E. Fout, Cypress, TX (US);
Leonardo Vicentini, Ferrara (IT)

(*) Notice: Subject to any disclaimer, the term of this patent is extended or adjusted under 35 U.S.C. 154(b) by 61 days.

(21) Appl. No.: 15/737,295

(22) PCT Filed: Jun. 27, 2016

(86) PCT No.: PCT/US2016/039643
§ 371 (c)(1),
(2) Date: Dec. 17, 2017

(87) PCT Pub. No.: WO2016/210435
PCT Pub. Date: Dec. 29, 2016

(65) Prior Publication Data
US 2018/0169705 A1  Jun. 21, 2018

Related U.S. Application Data

(60) Provisional application No. 62/184,947, filed on Jun. 26, 2015, provisional application No. 62/185,140, filed on Jun. 26, 2015.

(51) Int. Cl.
*B07B 1/52* (2006.01)
*B04B 3/04* (2006.01)
(Continued)

(52) U.S. Cl.
CPC ............... *B07B 1/528* (2013.01); *B04B 3/04* (2013.01); *B07B 1/55* (2013.01); *B08B 1/04* (2013.01);
(Continued)

(58) Field of Classification Search
CPC ........ F26B 5/16; F26B 25/06; F26B 2200/12; F26B 5/08; B07B 1/528; B07B 1/55;
(Continued)

(56) References Cited

U.S. PATENT DOCUMENTS 4,612,865 A  9/1986 Nilsson et al.
4,991,766 A  2/1991 Hunnicutt, III et al.
(Continued)

OTHER PUBLICATIONS

International Search Report and Written Opinion for the equivalent International patent application PCT/US2016/039643 dated Sep. 12, 2016.

(Continued)

*Primary Examiner* — Jessica Yuen
(74) *Attorney, Agent, or Firm* — Jeffrey D. Frantz

(57) ABSTRACT

A centrifugal dryer includes a housing and a basket positioned within the housing. The basket defines an opening formed laterally there through. The basket rotates around a central longitudinal axis through the housing. An annulus is formed between the basket and the housing. A cleaning device is positioned within the annulus, and the cleaning device introduces a liquid into the annulus. A scraping device is positioned within the annulus, and the scraping device rotates to remove cuttings from at least one surface.

20 Claims, 13 Drawing Sheets

(51) Int. Cl.
- *B07B 1/55* (2006.01)
- *B08B 1/04* (2006.01)
- *B08B 3/02* (2006.01)
- *F26B 25/06* (2006.01)
- *F26B 5/08* (2006.01)

(52) U.S. Cl.
CPC ............... *B08B 3/02* (2013.01); *F26B 25/06* (2013.01); *F26B 5/08* (2013.01)

(58) Field of Classification Search
CPC .. B08B 3/02; B08B 1/04; B01D 41/04; B04B 3/04; B04B 15/06
See application file for complete search history.

(56) References Cited

U.S. PATENT DOCUMENTS

| | | |
|---|---|---|
| 5,163,895 A | 11/1992 | Titus |
| 5,987,769 A | 11/1999 | Ackerman et al. |
| 2003/0221331 A1 | 12/2003 | Reddoch |
| 2014/0310972 A1* | 10/2014 | Holmes ................. B04B 3/00 34/58 |

OTHER PUBLICATIONS

International Preliminary Report on Patentability for the equivalent International patent application PCT/US2016/039643 dated Jan. 4, 2018.

\* cited by examiner

US 10,569,305 B2

CLEANING SYSTEM FOR A CENTRIFUGAL DRYER

BACKGROUND INFORMATION

Centrifugal dryers are used in a range of industries for separation of solids and liquids. Centrifugal dryers in the oilfield industry may additionally be used for cleaning and drying of solids. Centrifugal dryers may rotate about a central longitudinal axis, generating a force that causes the solids to move radially-outward and contact a screen. The liquid may pass through the screen and be separated from the solids by flowing radially-outward through the screen.

In the oilfield industry, a downhole tool may be run into a wellbore. The downhole tool may include a mud motor and a drill bit. To drill the wellbore to greater depths, a drilling fluid may be pumped through the downhole tool from a surface location. The drilling fluid may flow through the mud motor in the downhole tool, which may cause the mud motor to rotate the drill bit. Rotation of the drill bit may dislodge cuttings from the surrounding formation, and the drilling fluid and the cuttings may flow back up to the surface through an annulus formed between the downhole tool and a wall of the wellbore.

Once the cuttings reach the surface, the cuttings may be introduced to a shaker, which may remove a portion of the liquid (e.g., drilling fluid, water, hydrocarbons) from the cuttings. The now partially-dried cuttings may be introduced into the centrifugal dryer. The dryer may rotate about a central longitudinal axis. This may generate a centrifugal force that causes the cuttings to move radially-outward where the cuttings contact a frustoconical screen. An additional portion of the liquid may be separated from the cuttings by flowing radially-outward through the screen.

Oftentimes, the cuttings may clog the openings in the screen. To clean the screen, the dryer may be shut down, and an operator may open a door of the dryer, reach in, and manually separate the cuttings from the screen.

BRIEF DESCRIPTION OF THE DRAWINGS

So that the recited features may be understood in detail, a more particular description, briefly summarized above, may be had by reference to one or more embodiments, some of which are illustrated in the appended drawings. It is to be noted, however, that the appended drawings are illustrative embodiments, and are, therefore, not to be considered limiting of its scope.

DETAILED DESCRIPTION

Figure 1:
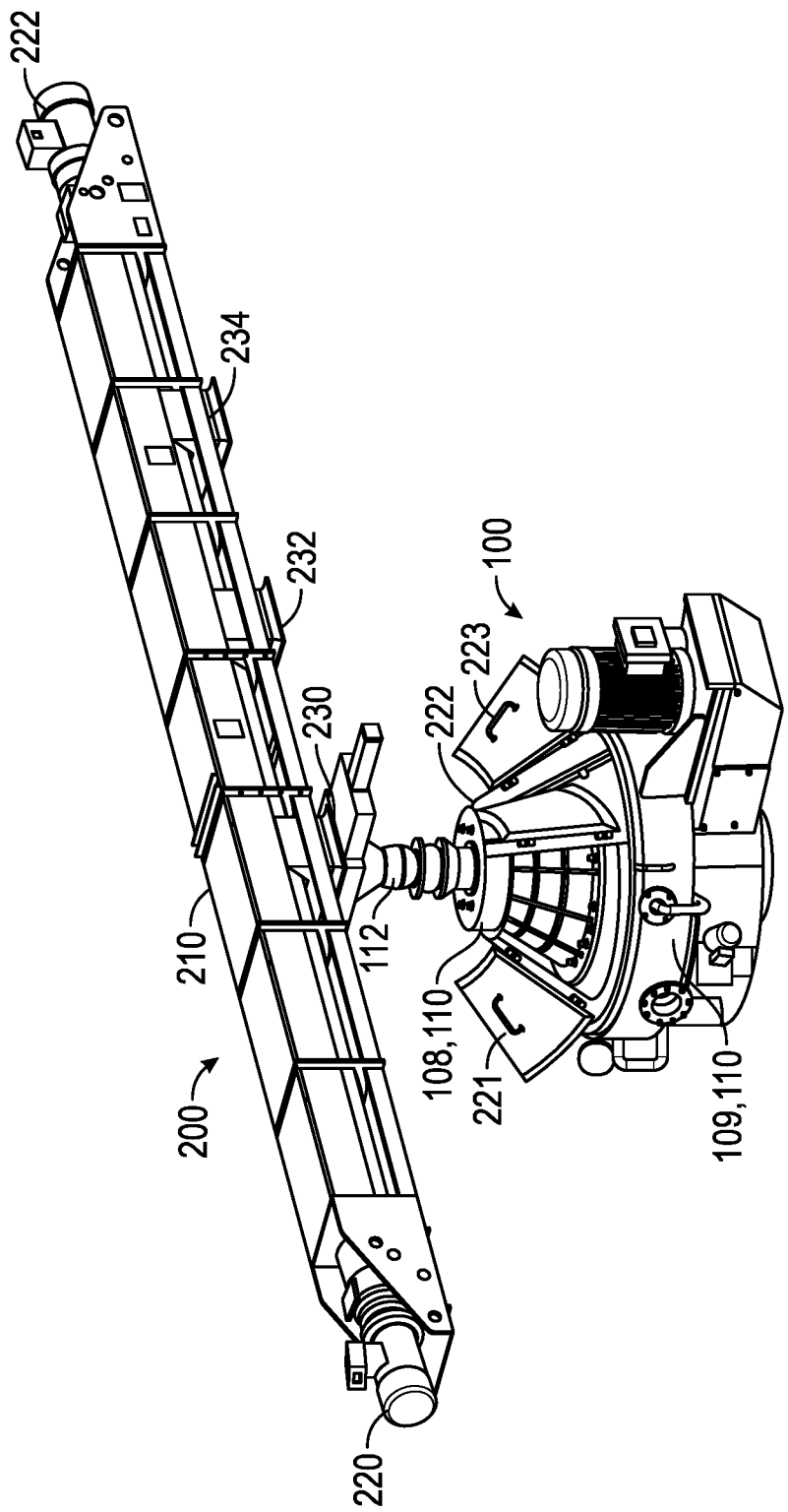
FIG. 1 depicts a perspective view of an auger conveyor coupled to a centrifugal dryer, according to an embodiment.

Embodiments of the present disclosure may relate generally to centrifugal dryers that dry cuttings returned from a wellbore. In more particular embodiments, systems and methods for cleaning a centrifugal dryer are provided. For example, in some embodiments, systems and methods for preventing the cuttings from building up and forming a blockage in a centrifugal dryer is disclosed herein.

Centrifugal dryers according to embodiments of the present disclosure may generally include a housing and a rotatable basket and cone disposed within the housing in a configuration to allow fluid to be separated from spent cuttings (cuttings returned from a wellbore). Spent cuttings may be directed into a centrifugal dryer (e.g., by an auger conveyor), within an inner annulus formed between the rotatable basket and cone, where rotation of the cone may force the spent cuttings radially outward toward the basket, and rotation of the basket may force return fluid from the spent cuttings outwardly, wherein the return fluid may move through one or more openings in the basket to be separated from the cuttings. According to embodiments of the present disclosure, a centrifugal dryer may be provided with at least one cleaning device to clean cuttings from one or more surfaces of the centrifugal dryer. Cleaning devices according to embodiments of the present disclosure may include, for example, fluid control devices (for directing fluid through the centrifugal dryer at a pressure to remove or clean away cuttings from surface(s) of the centrifugal dryer) and/or scraping devices (for scraping one or more surfaces of the centrifugal dryer to remove or clean away cuttings from the surface(s)).

For example, in some embodiments, a centrifugal dryer may include a housing, a separation section of the housing having a cone and a basket positioned at least partially around the cone disposed therein, wherein the cone and the basket are configured to rotate around a central longitudinal axis that extends through the housing, a launder section of the housing positioned below the separation section, an annulus formed between the basket and the housing and extending through the separation section and the launder section, and at least one cleaning device configured to direct fluid through the annulus to clean the centrifugal dryer.

According to embodiments of the present disclosure, a centrifugal dryer may include a housing, a basket positioned within the housing, wherein the basket defines one or more openings formed laterally there through, wherein the basket is configured to rotate around a central longitudinal axis through the housing, and wherein an annulus is formed between the basket and the housing, and at least one scraping device disposed within the housing and configured to scrape and remove particles that stick to a stationary surface in the housing. In some embodiments, a scraping device may include a moveable plate or bladed extension that is directly or indirectly secured to the basket, which may rotate with the basket to scrape one or more surfaces in the centrifugal dryer. In some embodiments, a scraping device may include a cutting removal device having one or more moveable plates or bladed extensions that are rotated against one or more stationary surfaces of the centrifugal dryer by a rotatable shaft to clean or remove cuttings from the stationary surface(s).

In some embodiments, two or more types of cleaning devices may be used in combination in a single centrifugal dryer. In some embodiments, a single type of cleaning device may be used in a single centrifugal dryer.

Some embodiments of the present disclosure are described in more detail below in correspondence with the figures. With respect to the figures, like numbers represent like parts. If an item is described with respect to one figure, and is numbered again in a second figure, it may not be described a second time.

Figure 2:
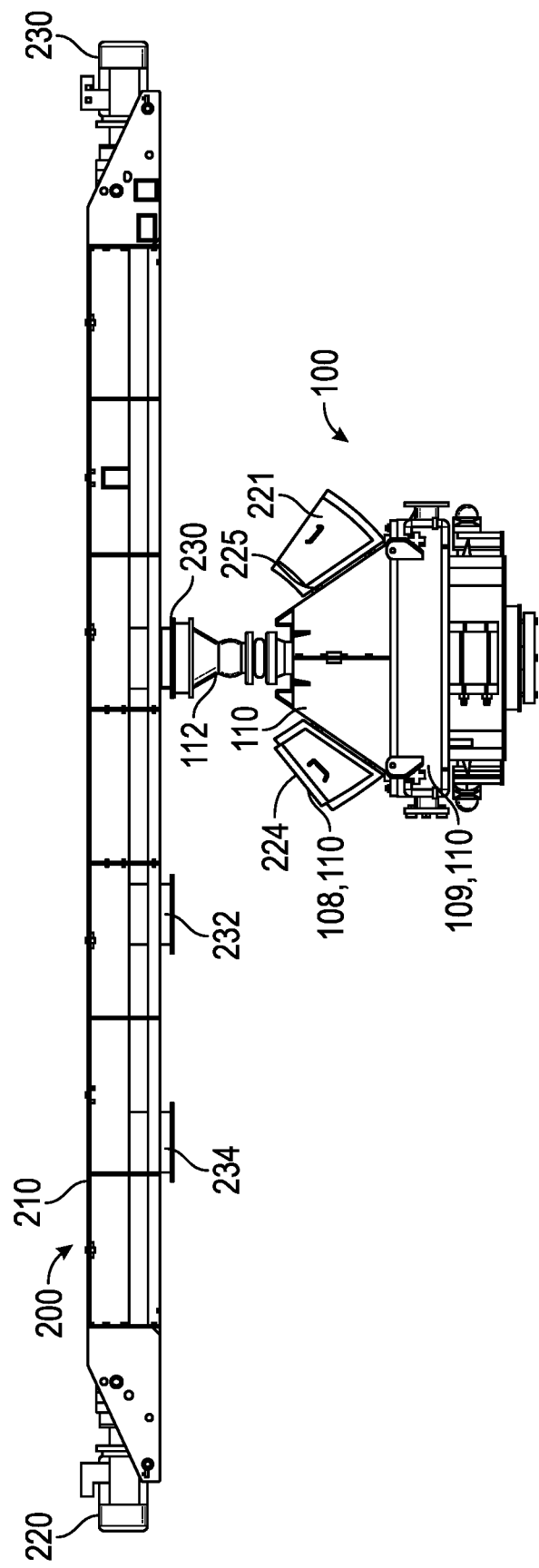
FIG. 2 depicts a side view of the auger conveyor and the centrifugal dryer shown in FIG. 1, according to an embodiment.
Figure 3:
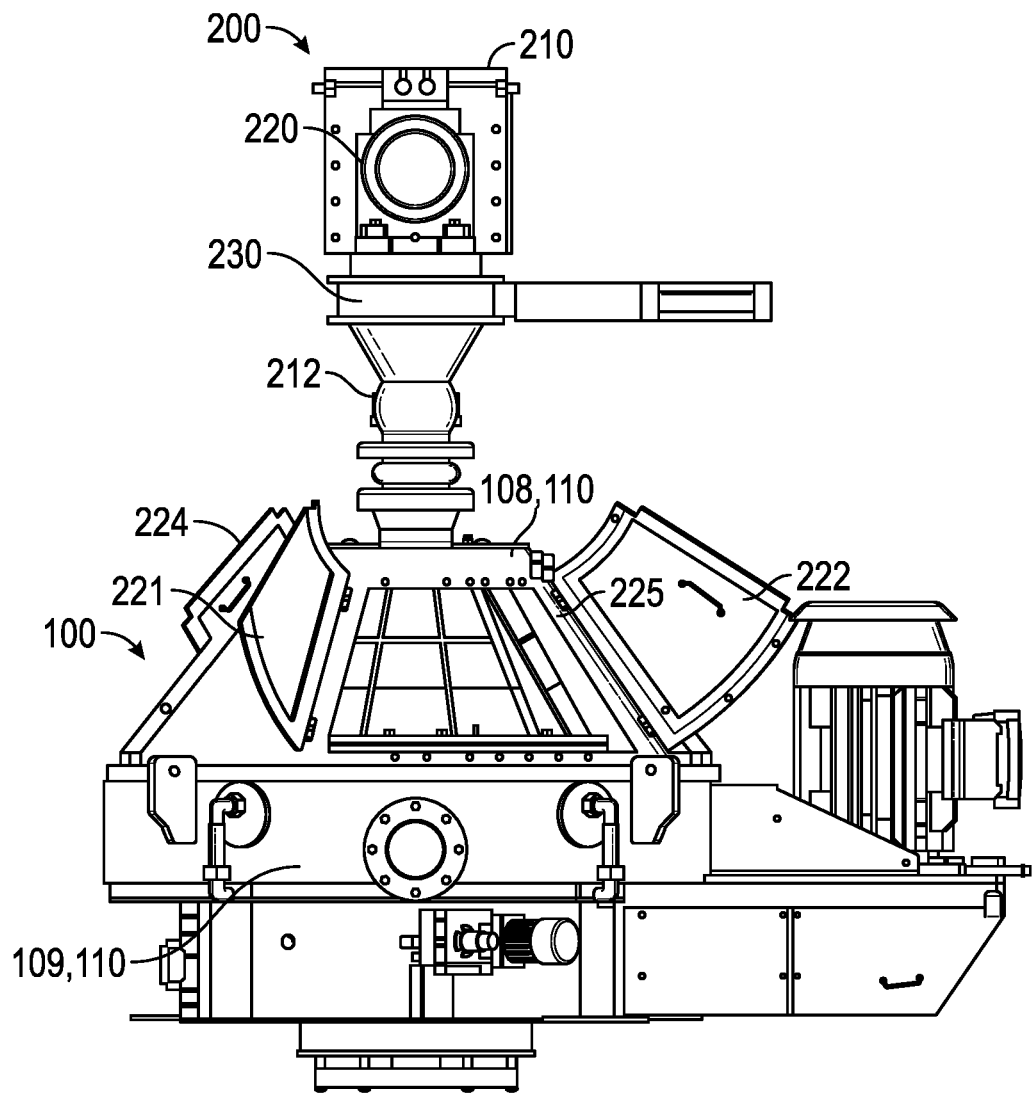
FIG. 3 depicts an end view of the auger conveyor and the centrifugal dryer shown in FIG. 1, according to an embodiment.

FIGS. 1-3 depict a perspective view, a side view, and an end view, respectively, of an auger conveyor 200 coupled to a centrifugal dryer 100, according to an embodiment. The auger conveyor 200 (also known as a screw conveyor) may include a tubular member 210 having a circular or rectangular cross-sectional shape. The tubular member 210 may have one or more inlets for receiving drill cuttings from a wellbore. In at least one embodiment, the cuttings may first be at least partially dried by a shaker (not shown), and the cuttings may then be transferred from the shaker to the tubular member 210 through the inlet(s).

The auger conveyor 200 may also include a rotating helical screw blade positioned within the tubular member 210. One or more motors (two are shown: 220, 222) may be coupled to the screw blade and configured to cause the screw blade to rotate about a central longitudinal axis therethrough. As shown, a first motor 220 may be coupled to a first end of the screw blade, and a second motor 222 may be coupled to a second, opposing end of the screw blade. Having two motors 220, 222 at opposing ends of the screw blade may reduce the load on each motor 220, 222 as well as provide a redundancy in the event that one of the motors 220, 222 is taken offline.

The rotation of the screw blade may cause the cuttings to move axially through the tubular member 210, and the cuttings may exit the tubular member 210 via one or more outlets (three are shown: 230, 232, 234). The centrifugal dryer 100 is shown coupled to the first outlet 230 and configured to receive at least a portion of the cuttings therethrough. In at least one embodiment, an additional centrifugal dryer may be coupled to the second outlet 232 and be configured to receive at least a portion of the cuttings therethrough. Having the auger conveyor 200 coupled to two or more centrifugal dryers 100 may allow a greater amount of cuttings to be dried per unit of time. In addition, in the event that the centrifugal dryer 100 is taken offline for any reason, the auger conveyor 200 may continue to output cuttings to the additional centrifugal dryer through the second outlet 232. For example, the first outlet 230 may be closed to allow the cuttings to bypass the first outlet 230 and the centrifugal dryer 100 while continuing to be output through the second outlet 232 and/or third outlet 234.

Moreover, at least one of the outlets (e.g., the third outlet 234) may not have a centrifugal dryer 100 coupled thereto. Rather, the third outlet 234 may be coupled to a storage container or location for the cuttings. For example, when one or more moisture sensors in the shaker or the auger conveyor 200 indicate that the cuttings are sufficiently dry after exiting the shaker and, thus, do not need to be dried further by the centrifugal dryer(s) 100, the cuttings may bypass the centrifugal dryer(s) 100, and travel through the third outlet 234 to the storage container or location.

The centrifugal dryer 100 may include a housing 110. The housing 110 may include an upper portion 108 referred to as a shield and a lower portion 109 referred to as a frame. The upper portion 108 of the housing 110 may include one or more doors (four are shown: 221-224) that allow a user to access the internals of the centrifugal dryer 100. As shown, there may be two sets of doors 221-224 (with two doors in each set), and each set may offset from the other set by about 180 degrees with respect to a central longitudinal axis through the centrifugal dryer 100. The first set of doors 221, 222 may be best seen in FIG. 3. Each of the doors 221, 222 in the first set may include an outer edge and an inner edge. The outer edges may be coupled to the housing 110 via one or more hinges 225, and the doors 221, 222 may be configured to rotate or pivot from a closed position to an open position about the hinges 225. The doors 221, 222 are shown in the open position in FIG. 3. When the doors 221, 222 are in the closed position, the inner edges may be adjacent to one another.

Figure 4:
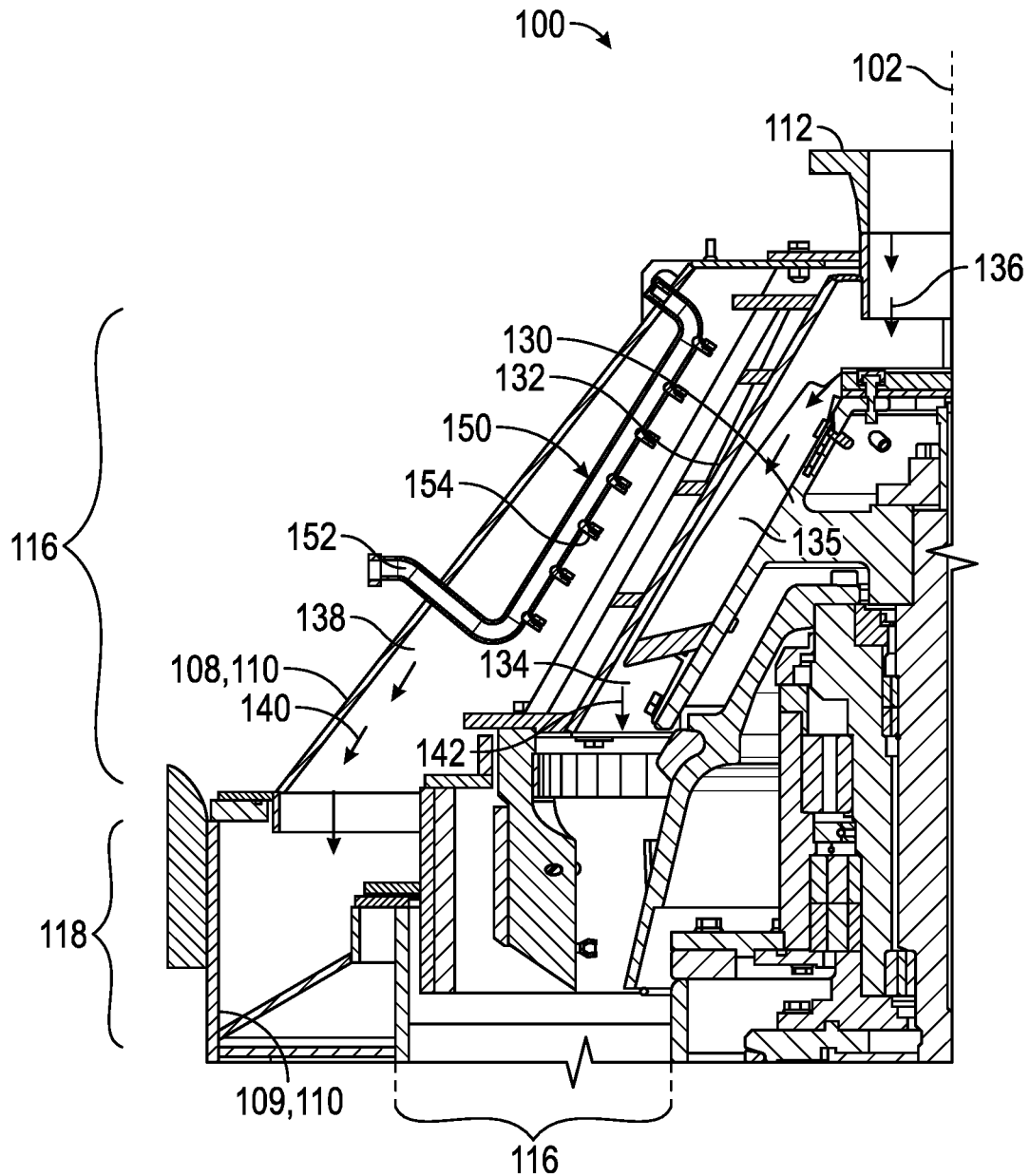
FIG. 4 depicts a portion of a side cross-sectional view of a centrifugal dryer, according to an embodiment.

FIG. 4 depicts a portion of a side cross-sectional view of a centrifugal dryer 100, according to an embodiment. The centrifugal dryer 100 may include a housing 110. The housing 110 may include an upper portion 108 referred to as a shield and a lower portion 109 referred to as a frame. The upper portion 108 of the housing 110 may include one or more inlets (one is shown: 112). The inlet 112 may provide a path of fluid communication into a separation section 116 of the centrifugal dryer 100.

The separation section 116 of the centrifugal dryer 100 may include a cone 130. The cone 130 may have a conical or frustoconical shape. As such, the cross-sectional length (e.g., diameter) of the cone 130 may increase moving downward (e.g., away from the inlet 112). The cone 130 may be configured to rotate around a central longitudinal axis 102 through the housing 110. For example, the cone 130 may rotate from about 490 RPM to about 1480 RPM or from about 690 RPM to about 985 RPM. One or more blades 135 may be coupled to the cone 130 and extend radially-outward therefrom.

The separation section 116 of the centrifugal dryer 100 may also include a basket 132 positioned at least partially around the cone 130. The basket 132 may have a plurality of openings formed laterally (e.g., radially) therethrough. For example, the basket 132 may be or include a screen. The openings in the basket 132 may have a cross-sectional length (e.g., diameter) from about 0.1 mm to about 0.6 mm. The cross-sectional length of the basket 132 may increase moving downward (e.g., away from the inlet 112). The basket 132 may be configured to rotate around the central longitudinal axis 102 through the housing 110. More particularly, the basket 132 may rotate in the same direction as the cone 130 but faster than the cone 130. For example, the basket 132 may rotate from about 500 RPM to about 1500 RPM or from about 700 RPM to about 1000 RPM.

A first, inner annulus 134 may be defined between the cone 130 and the basket 132. Similar to the cone 130 and the basket 132, the cross-sectional length of the inner annulus 134 may also increase moving downward (e.g., away from the inlet 112). Cuttings from a wellbore may flow through the inlet 112 of the centrifugal dryer 100 and into the inner annulus 134, as shown by arrows 136. Gravity may cause the cuttings to descend through the inner annulus 134 (e.g., away from the inlet 112). The blades 135 may also push the cuttings downward. Simultaneously, the rotation of the cone 130 and the basket 132 may exert a centrifugal force on the cuttings that causes the cuttings to move radially-outward and into contact with the basket 132. Once the cuttings contact the basket 132, at least a portion of the liquid in the cuttings may be separated from the cuttings and pass through the openings in the basket 132 to a second, outer annulus 138 that is formed between the basket 132 and the upper portion 108 of the housing 110. During this liquid separation process, the centrifugal force on the cuttings may cause the cuttings to plug or clog at least a portion of the openings in the basket 132.

A first cleaning device 150 may be positioned at least partially within the separation section 116 of the housing 110 and configured to unplug or unclog the openings in the basket 132. As shown, the first cleaning device 150 may be positioned in the outer annulus 138; however, in other embodiments, the first cleaning device 150 may be positioned in the inner annulus 134. The first cleaning device 150 may include a hollow tube 152. The tube 152 may extend from an exterior of the housing 110, through the housing 110, and to the outer annulus 138. The portion of the tube 152 in the outer annulus 138 may be oriented at an angle from about 30 degrees to about 60 degrees with respect to the central longitudinal axis 102. Said another way, a radial distance between the tube 150 and the central longitudinal axis 102 may increase moving axially-away from the inlet 112. This may allow the distance between the tube 152 and the basket 132 to remain substantially constant along the length of the tube 152. As a result, the fluid exiting the tube 152 may have a substantially constant pressure impact along the length of the basket 132.

The tube 152 may include one or more outlets (eight are shown: 154) through which fluid may exit the tube 152. The outlets 154 may be axially-offset from one another along the length of the tube 152. The outlets 154 may be pointed radially-inward with respect to the central longitudinal axis 102 (i.e., toward the basket 132). In at least one embodiment, the outlets 154 may include nozzles or other flow-restricting devices that may increase the velocity of the fluid as the fluid exits the tube 152. As such, fluid may exit the tube 152 through the outlets 154 at a high velocity and contact the outer surface of the basket 132. The fluid may be or include water, base oil, synthetic fluid, air, or a combination thereof. The first cleaning device 150 is described in greater detail below as part of the description for FIG. 15.

Returning now to the separation of the liquid from the cuttings, after passing through the openings in the basket 132 and into the outer annulus 138, the liquid may flow down through the outer annulus 138, exit the separation section 116 of the centrifugal dryer 100, and enter a launder section 118 of the centrifugal dryer 100, as shown by arrows 140. The remaining cuttings, now dryer than they were when they entered the centrifugal dryer 100, may continue to flow down the inner annulus 134, exit the separation section 116 of the centrifugal dryer 100, and enter the launder section 118 of the centrifugal dryer 100, as shown by arrows 142. The launder section 118 may be positioned below the separation section 116.

Figure 5:
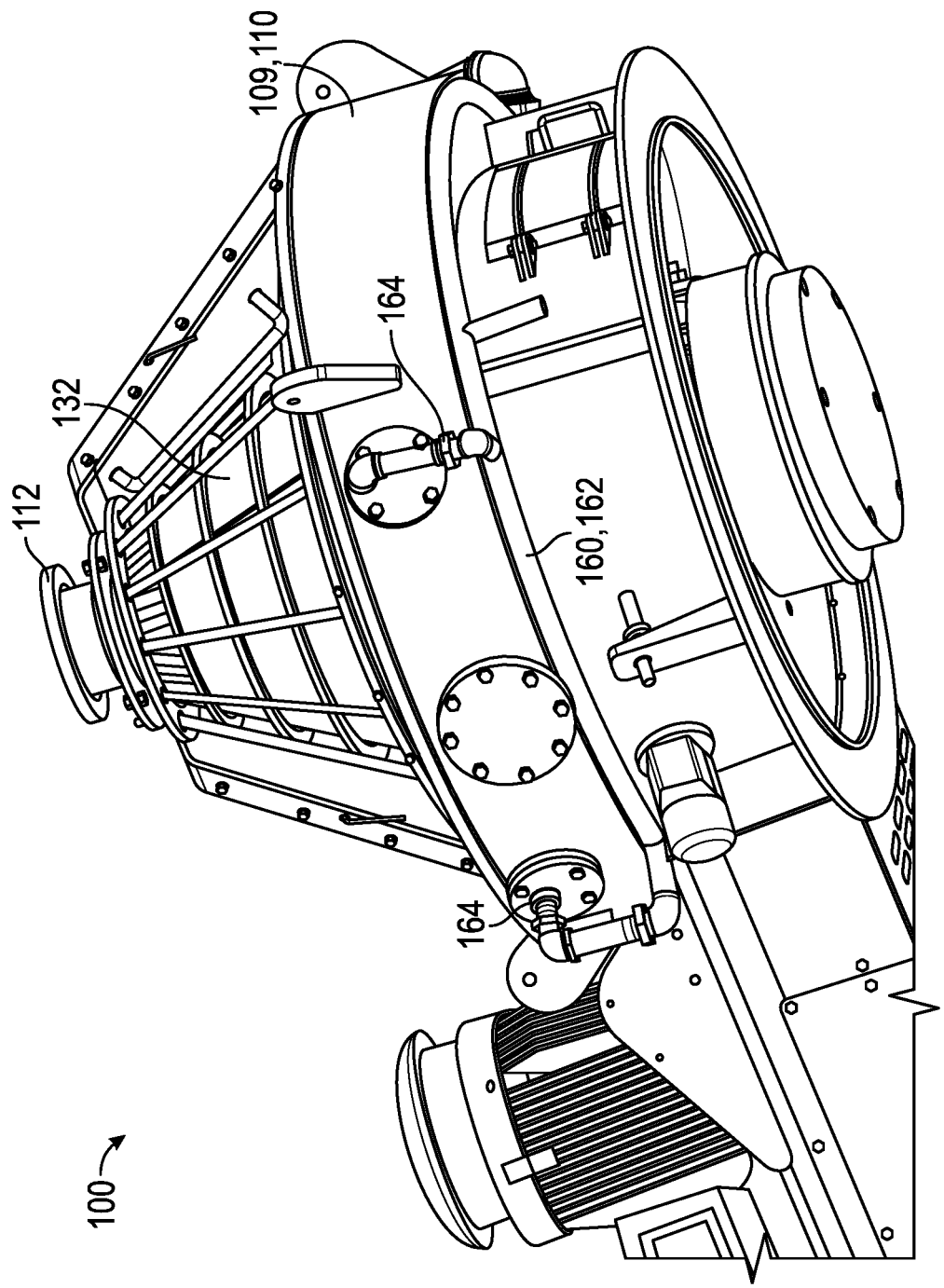
FIG. 5 depicts a perspective view of the centrifugal dryer showing a cleaning device, according to an embodiment.

FIG. 5 depicts a perspective view of the centrifugal dryer 100 showing a second cleaning device 160, according to an embodiment. The liquid that separates from the cuttings in the separation section 116 and flows into the launder section 118 through the outer annulus 138 may be viscous. For example, the liquid may contain as much as 30% fine particles. The second cleaning device 160 may introduce additional liquid into the outer annulus 138 of the launder section 118 to facilitate the flow of the separated liquid out of the housing 110 and into a recovery tank.

The second cleaning device 160 may include a hollow tube 162. The tube 162 may be flexible or rigid. At least a portion of the tube 162 may be positioned on an exterior of the housing 110. As shown, the portion of the tube 162 on the exterior of the housing 110 may at least partially surround the lower portion 109 of the housing 110. The tube 162 may include one or more inlets (two are shown: 164) that extend into and/or through the housing 110. The inlets 164 may be circumferentially-offset from one another about the central longitudinal axis 102.

Figure 6:
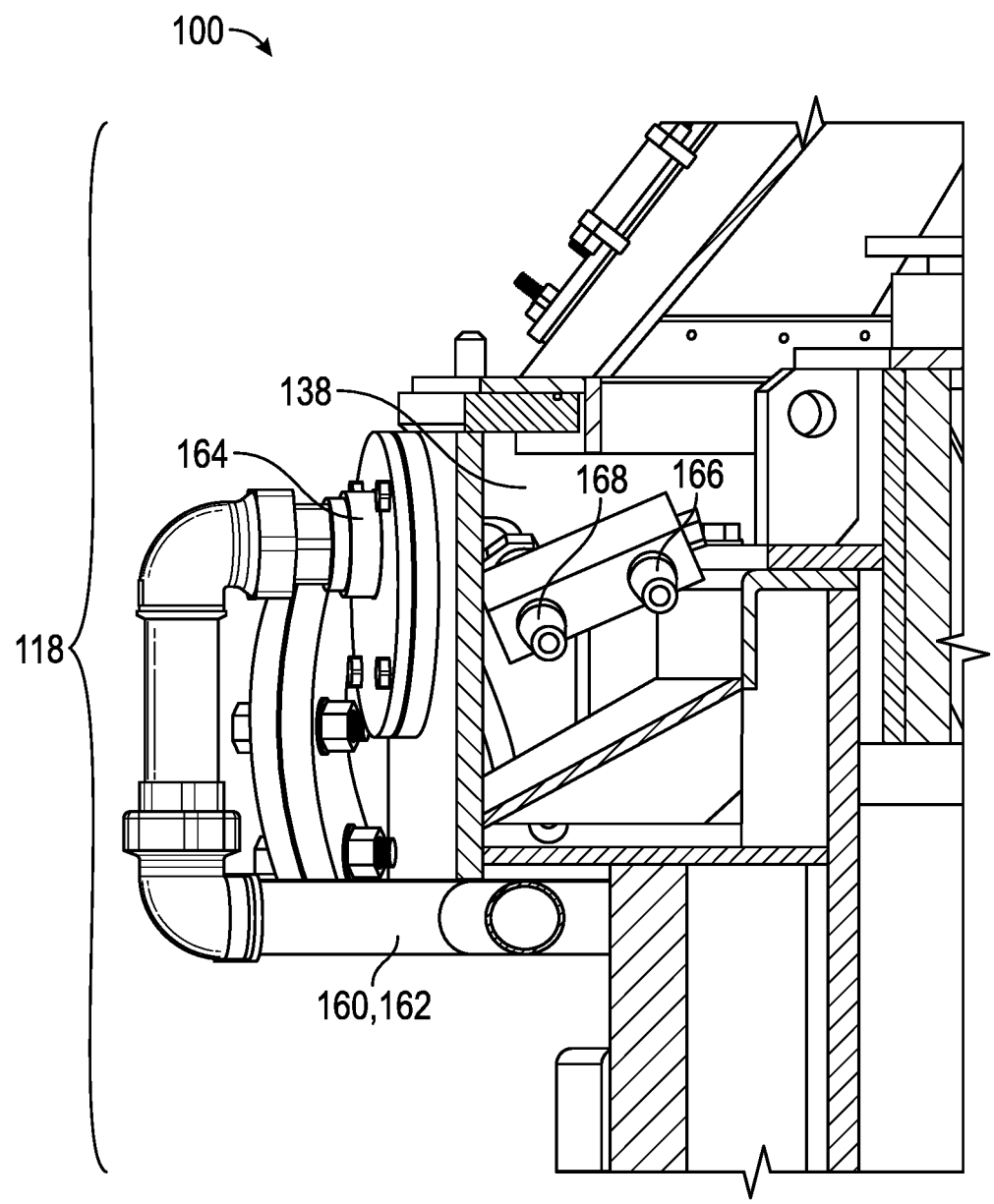
FIG. 6 depicts a portion of a side cross-sectional view of the centrifugal dryer showing the cleaning device, according to an embodiment.

FIG. 6 depicts a portion of a side cross-sectional view of the centrifugal dryer 100 showing the second cleaning device 160, according to an embodiment. As shown, the inlet 164 of the tube 162 may extend into the outer annulus 138. More particularly, the inlet 164 of the tube 162 may extend into the outer annulus 138 within the launder section 118 of the housing.

The tube 162 may include one or more outlets (two are shown: 166, 168) through which liquid may exit the tube 162. In at least one embodiment, the outlets 166, 168 may include nozzles or other flow-restricting devices that may increase the velocity of the liquid as the liquid exits the tube 162. As shown, the first outlet 166 may be positioned radially-inward from the second outlet 168, with respect to the central longitudinal axis 102. In addition, the first outlet 166 may be positioned above, aligned with, or below the second outlet 168, with respect to the central longitudinal axis 102. The outlets 166, 168 may be oriented so as to output the liquid in a substantially circumferential flowpath (with respect to the central longitudinal axis 102) within the outer annulus 138 in the launder section 118 of the housing 110. More particularly, the outlets 166, 168 may be oriented so as to output the liquid in the same direction that the cone 130 and the basket 132 are rotating in the separation section 116 of the housing 110.

Figure 7:
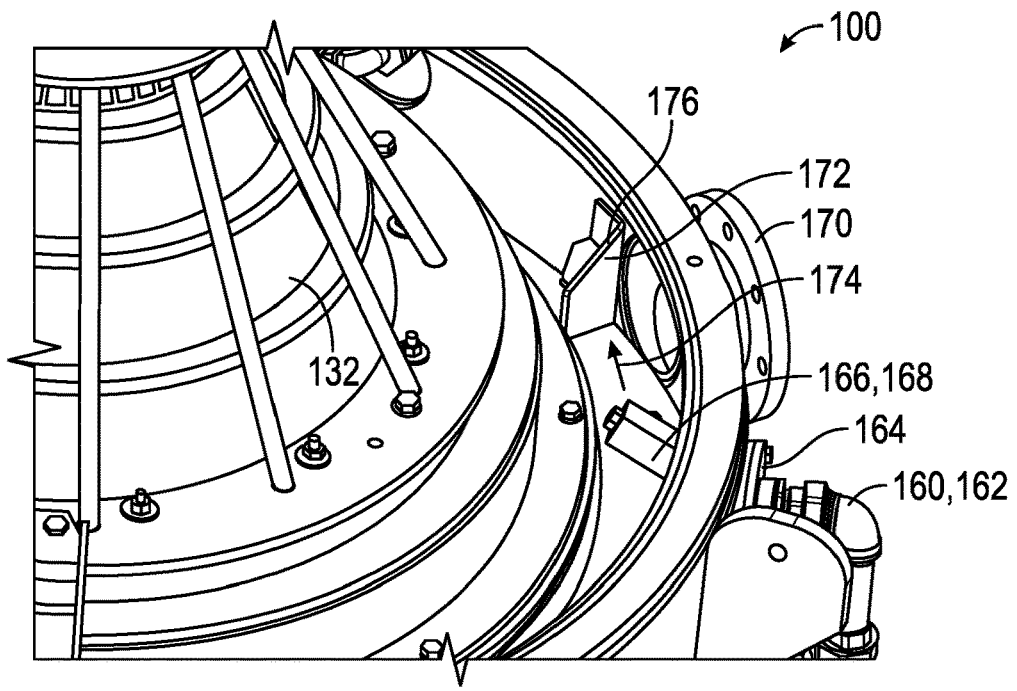
FIG. 7 depicts a perspective view of a portion of the centrifugal dryer with a section removed to show a dam plate, according to an embodiment.

FIG. 7 depicts a perspective view of a portion of the centrifugal dryer 100 with a section removed to show a dam plate 172, according to an embodiment. The lower portion 109 of the housing 110 may include an outlet 170 that allows the liquid to flow from the outer annulus 138 in the launder section 118 of the housing 110 to an exterior of the housing 110. The dam plate 172 may be positioned within the outer annulus 138 in the launder section 118 of the housing 110 and slightly downstream from the outlet 170. As shown in FIG. 7, the dam plate 172 is positioned downstream from (e.g., about 5 degrees to about 30 degrees with respect to the central longitudinal axis 102) the outlet 170 when the liquid flows in a clockwise direction within the outer annulus 138, as shown by arrows 174. The upper surface 176 of the dam plate 172 may be tapered. As a result, a height of the dam plate 172 may decrease moving inward from the housing 110.

The dam plate 172 redirects the recovered liquid and the flush liquid through the outlet 170 in the housing 110. This prevents the liquid from overshooting the outlet 170 causing the liquid to rise in the launder area 118, which may cause a buildup of solid particles that may eventually block the launder area 118.

Figure 8:
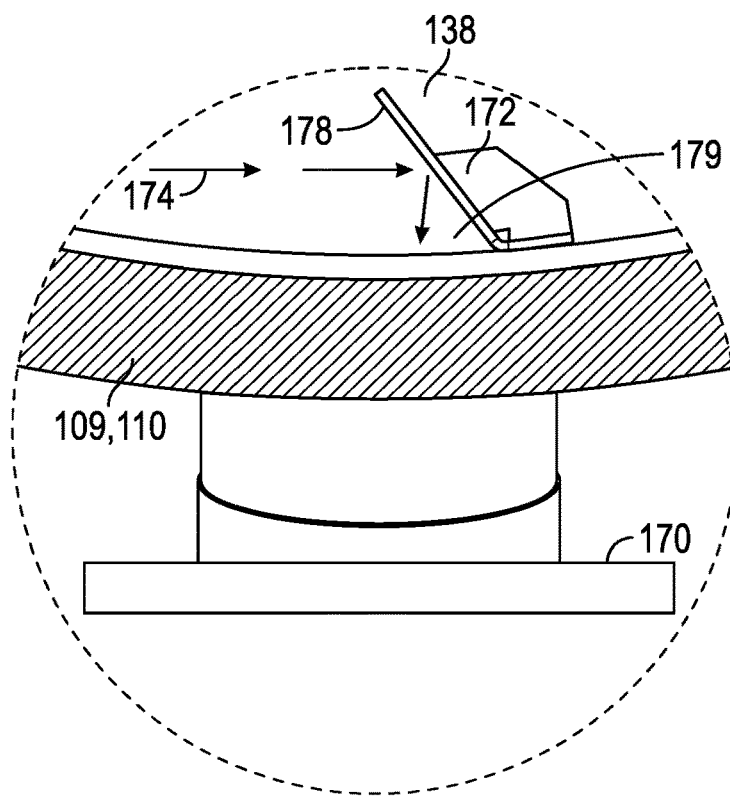
FIG. 8 depicts a top cross-sectional view of a portion of the centrifugal dryer showing the dam plate, according to an embodiment.

FIG. 8 depicts a top cross-sectional view of a portion of the centrifugal dryer 100 showing the dam plate 172, according to an embodiment. As shown, the dam plate 172 may be coupled to an inner surface of the housing 110. In at least one embodiment, the dam plate 172 may be substantially perpendicular to the housing 110. However, in other embodiments (as shown), an upstream surface 178 of the dam plate 172 may be oriented at an acute angle 179 with respect to the housing 110. The angle 179 may be from about 30 degrees to about 80 degrees or from about 40 degrees to about 70 degrees. As a result, the path of least resistance for the liquid after reaching the dam plate 172 may be out through the outlet 170 rather than continuing on for at least a portion of another loop in the outer annulus 138.

Figure 9:
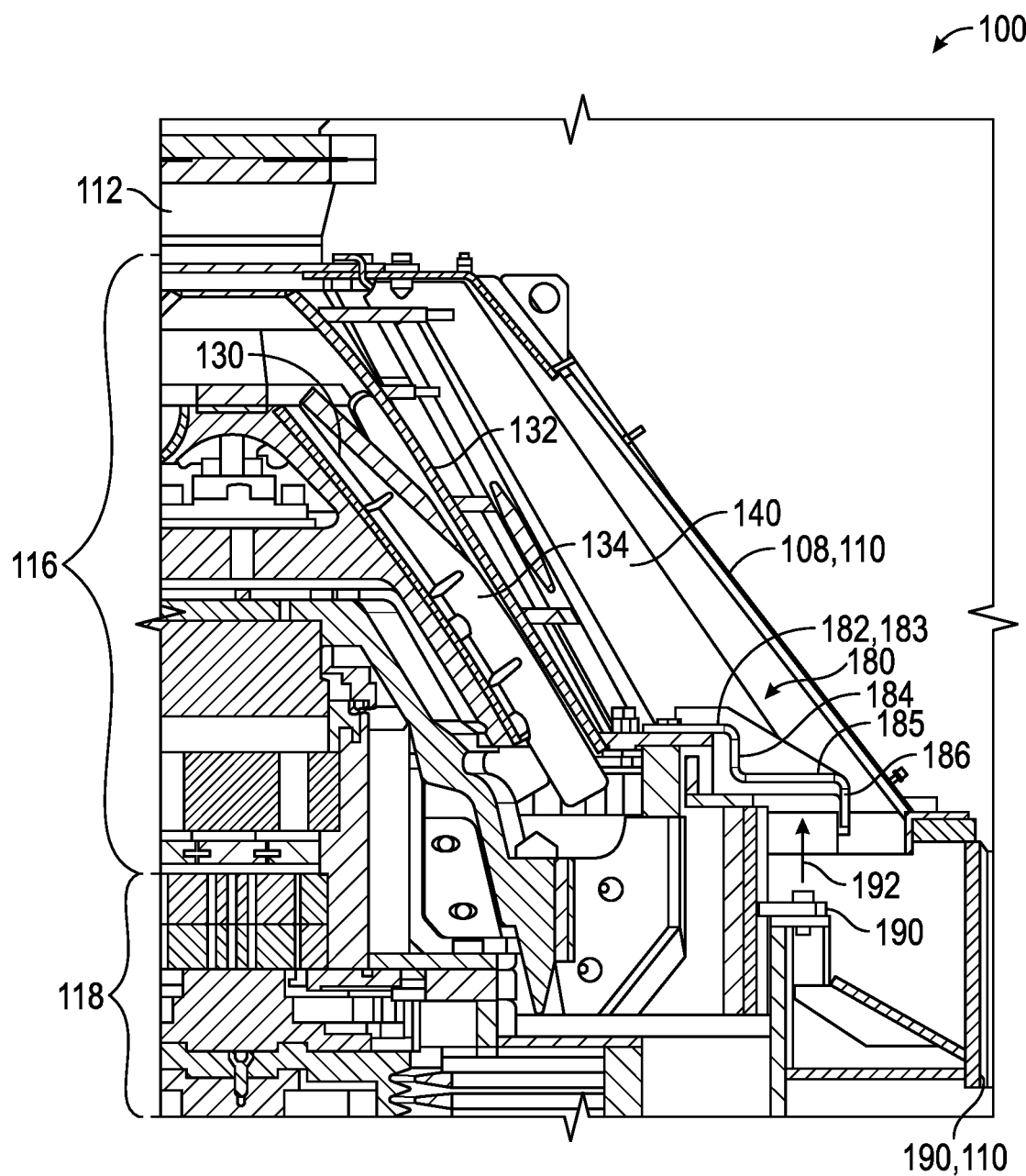
FIG. 9 depicts a portion of a side cross-sectional view of the centrifugal dryer showing another cleaning device, according to an embodiment.

FIG. 9 depicts a side cross-sectional view of the centrifugal dryer 100 showing a third cleaning device 180, according to an embodiment. As mentioned above, the liquid that separates from the cuttings in the separation section 116 and flows into the launder section 118 through the outer annulus 138 may contain fine particles. These fine particles may stick or adhere to one or more components within the housing 110. For example, the fine particles may stick or adhere to one or more stationary surfaces 190 in the outer annulus 138 of the launder section 118 of the housing 110. The fine particles may build up in the direction shown by arrow 192 until the fine particles contact one or more rotating components (e.g., the basket 132) and exert a drag force thereon. This may cause the drive system (e.g., motor) to have to exert additional torque.

The third cleaning device 180 may include one or more scrapers (one is shown: 182). The scraper 182 may be coupled to or integral with the cone 130 or the rotor of the cone 130. In this embodiment, the scraper 182 may be positioned within the inner annulus 134. In another embodiment (as shown), the scraper 182 may be coupled to or integral with the basket 132 or the rotor of the basket 132. In this embodiment, the scraper 182 may be positioned within the outer annulus 134. The scraper 182 may be configured to rotate around the central longitudinal axis 102 at the rate of the component to which it is coupled. As the scraper 182 moves, it may scrape and remove the particles that have built up in its path. In yet another embodiment, the scraper 182 may be coupled to or integral with a stationary component and configured to scrape and remove particles that are sticking or adhering to a rotating component (e.g., the cone 130, the basket 132, etc.).

The scraper 182 may include one or more radially-extending surfaces (two are shown: 183, 185) and one or more axially-extending surfaces (two are shown: 184, 186). The first radially-extending surface 183 may be coupled to or integral with the rotating component (e.g., the cone 130, the basket 132, etc.). The first axially-extending surface 184 may then extend downward from the first radially-extending surface 183. The second radially-extending surface 185 may extend radially-outward from the first axially-extending surface 184. The second axially-extending surface 186 may then extend downward from the second radially-extending surface 185. One or more of the surfaces 183-186 may include a hard-faced coating (e.g., carbide) to reduce wear.

Figure 10:
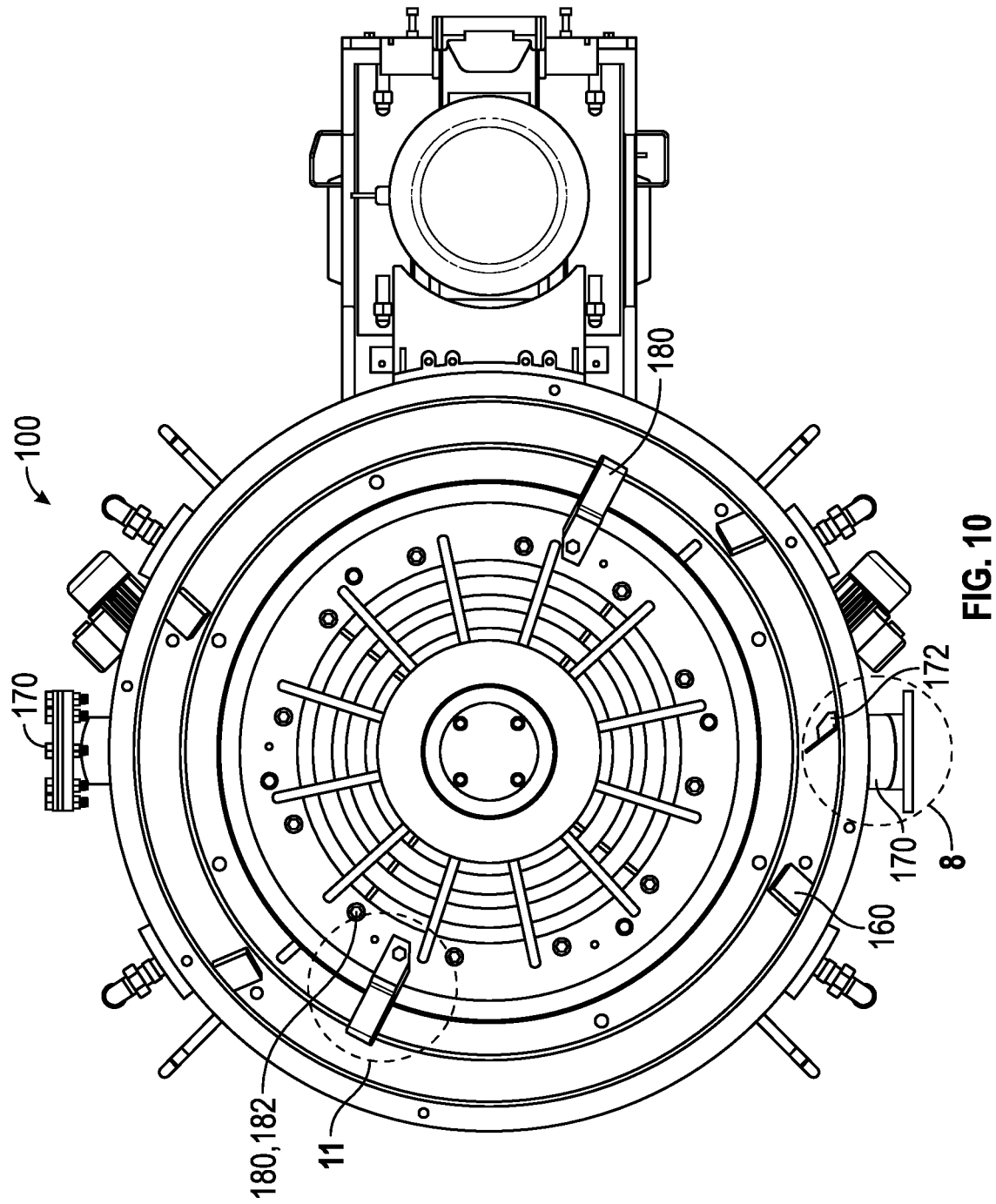
FIG. 10 depicts a top cross-sectional view of the centrifugal dryer showing the cleaning device of FIG. 9, according to an embodiment.
Figure 11:
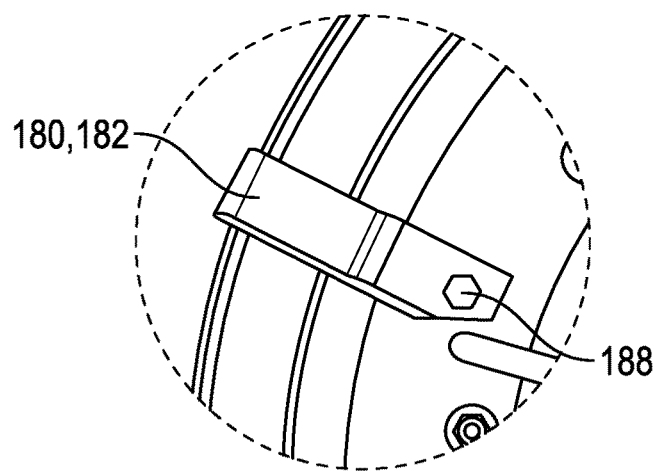
FIG. 11 depicts an enlarged view of the cleaning device shown in FIG. 10, according to an embodiment.

FIG. 10 depicts a top cross-sectional view of the centrifugal dryer showing two scrapers 182, and FIG. 11 depicts an enlarged view of one of the scrapers 182 from FIG. 10, according to an embodiment. As shown, the scrapers 182 may be circumferentially-offset from one another around the central longitudinal axis 102. In another embodiment, the scrapers 182 may be axially-offset from one another, with respect to the central longitudinal axis 102.

The scrapers 182 may be coupled to the rotating component (e.g., the cone 130, the basket 132, etc.) with one or more connection devices 188 such as screws, bolts, and the like. This may allow the scrapers 182 to be easily removed and replaced after they wear down from prolonged use.

Figure 12:
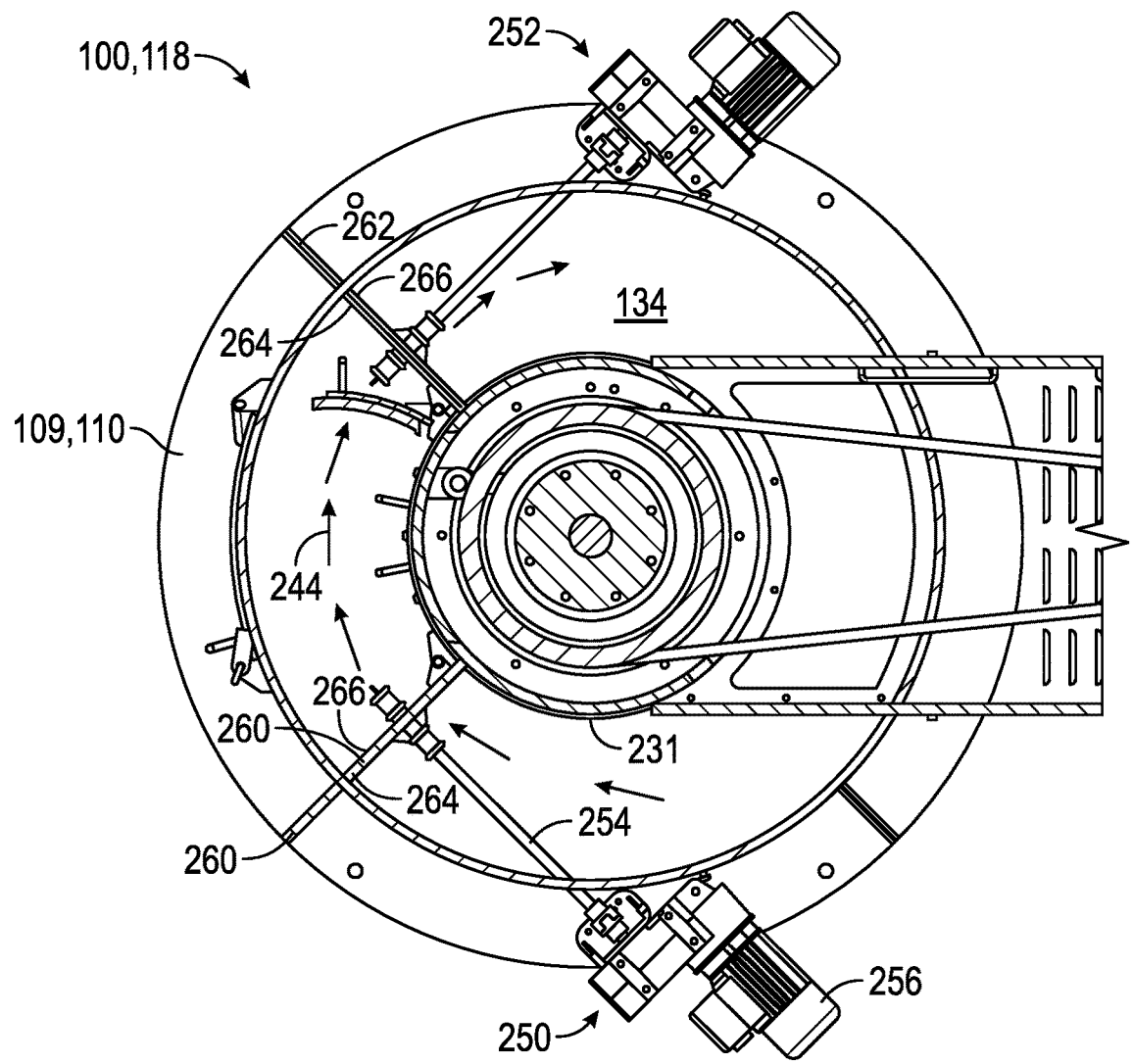
FIG. 12 depicts a top cross-sectional view of a portion of the centrifugal dryer showing one or more cutting removal devices, according to an embodiment.

According to embodiments of the present disclosure, another cleaning device may include a cutting removal device. FIG. 12 depicts a top cross-sectional view of a portion of the centrifugal dryer 100 showing one or more cutting removal devices (two are shown: 250, 252), according to an embodiment. The inner annulus 134 may extend from the separation section 116 into the launder section 118. As such, the cuttings in the inner annulus 134 may fall from the separation section 116 into the launder section 118. Although now positioned below the rotating cone 130 and the rotating basket 132, the cuttings may continue to move in a substantially circular path within inner annulus 134 in the launder section 118 due to the momentum generated in the separation section 116. For example, the cuttings may be moving clockwise through the inner annulus 134, as shown by the arrows 244 in FIG. 12.

One or more plates (two are shown: 260, 262) may be positioned within the inner annulus 134 in the launder section 118. As shown, the plates 260, 262 may be in the same quadrant of the inner annulus 134. The plates 260, 262 may be coupled to and extend radially-between an inner support assembly 231 for the cone 130 and the lower portion 109 of the housing 110 (i.e., the frame). The plates 260, 262 may structurally hold these components together.

Due to the substantially circular path 244 of the cuttings, at least a portion of the cuttings may contact the plates 260, 262. A majority of the cuttings that contact the plates 260, 262 may contact leading surfaces 264 of the plates 260, 262; however, some of the cuttings may contact trailing surfaces 266 of the plates 260, 262. Although the cuttings may have been at least partially dried by the shaker and the centrifugal dryer 100 at this point, the cuttings may still carry some liquid, which may cause the cuttings to stick and/or adhere to the plates 260, 262, eventually building up to create a blockage.

The cutting removal devices 250, 252 may serve to dislodge and/or remove the cuttings from the surfaces 264, 266 of the plates 260, 262. Each cutting removal device 250, 252 may include a shaft 254. A drive unit 256 may be coupled to each shaft 254 and configured to cause the shaft 254 to rotate about a central longitudinal axis that extends through the shaft 254. The drive unit 256 may be or include an electric motor, a pneumatic motor, a hydraulic motor, or the like. The shaft 254 may extend at least partially through the housing 110, at least partially through the inner annulus 134, and/or at least partially through at least one of the plates 260, 262. As shown, the shafts 254 may extend from the drive units 256 in different directions within the annulus 134. For example, the shaft 254 of the first cutting removal device 250 may extend away from the drive unit 256 in a substantially clockwise direction, and the shaft 254 of the second cutting removal device 252 may extend away from the drive unit 256 in a substantially counterclockwise direction.

Figure 13:
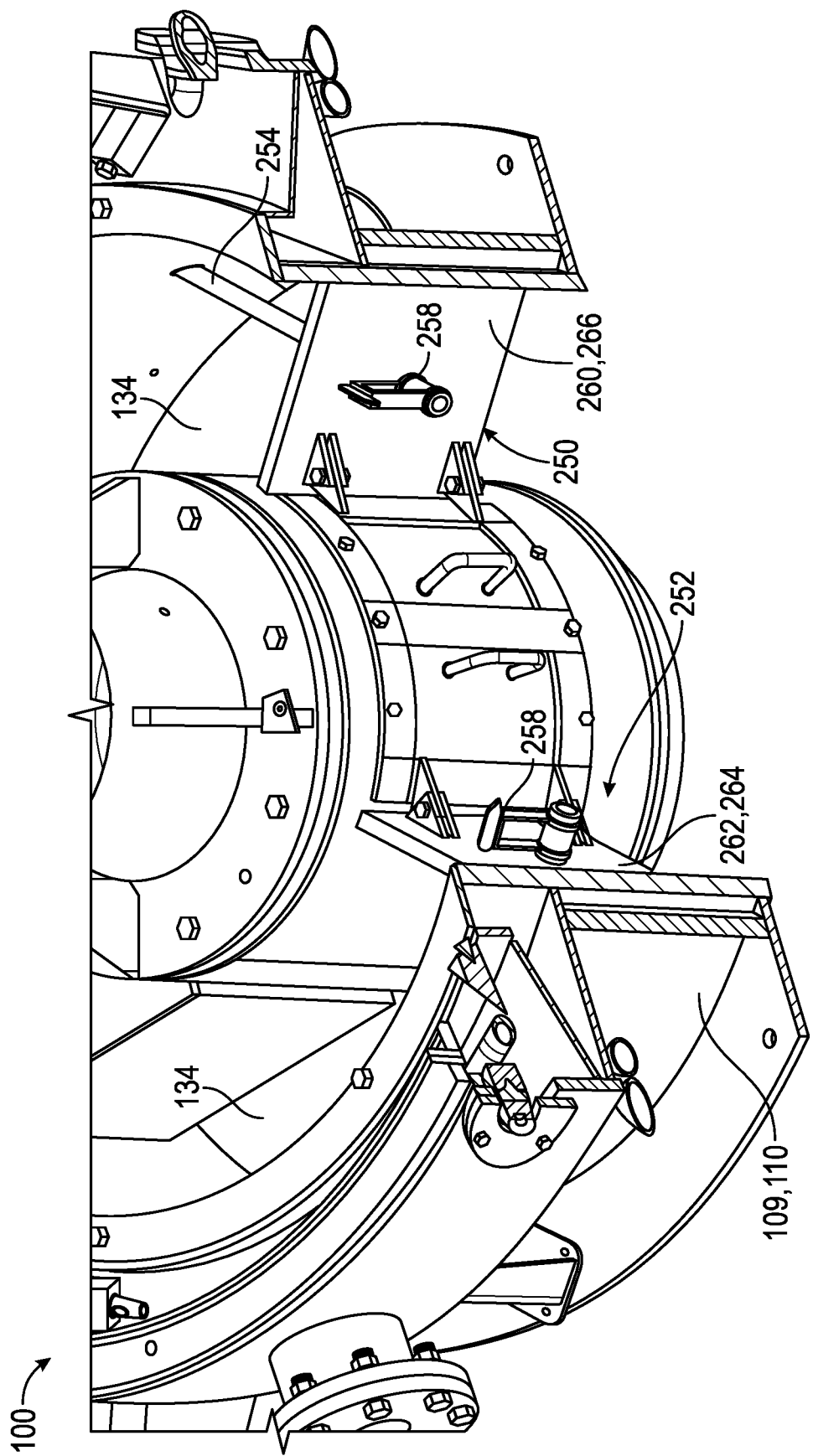
FIG. 13 depicts a perspective view of a portion of the centrifugal dryer with a section removed to show the cutting removal devices, according to an embodiment.

FIG. 13 depicts a perspective view of a portion of the centrifugal dryer 100 with a section removed to show the cutting removal devices 250, 252, according to an embodiment. Each shaft 254 may have one or more arms (one is shown: 258) coupled thereto. The arm 258 may extend radially-outward from the shaft 254. The arm 258 of the first cutting removal device 250 may be in contact with the trailing surface 266 of the first plate 260. The arm 258 of the second cutting removal device 252 may be in contact with the leading surface 264 of the second plate 262. In another embodiment, a small gap (e.g., 1 mm-10 mm) may exist between the arms 258 and the plates 260, 262. As the plates 260, 262 may be in the same quadrant of the inner annulus 134, the arms 258 of the first and second cutting removal devices 250, 252 may also be positioned within the same quadrant of the inner annulus 134.

The arms 258 may rotate together with the shafts 254. As the arms 258 rotate, the arms 258 may scrape and remove any cuttings that have become stuck or adhered to the surfaces 264, 266 of the plates 260, 262. This may prevent the cuttings from building up on the surfaces 264, 266 of the plates 260, 262, which may reduce the amount of time that the centrifugal dryer 100 is offline to manually remove the cuttings from the plates 260, 262.

Figure 14:
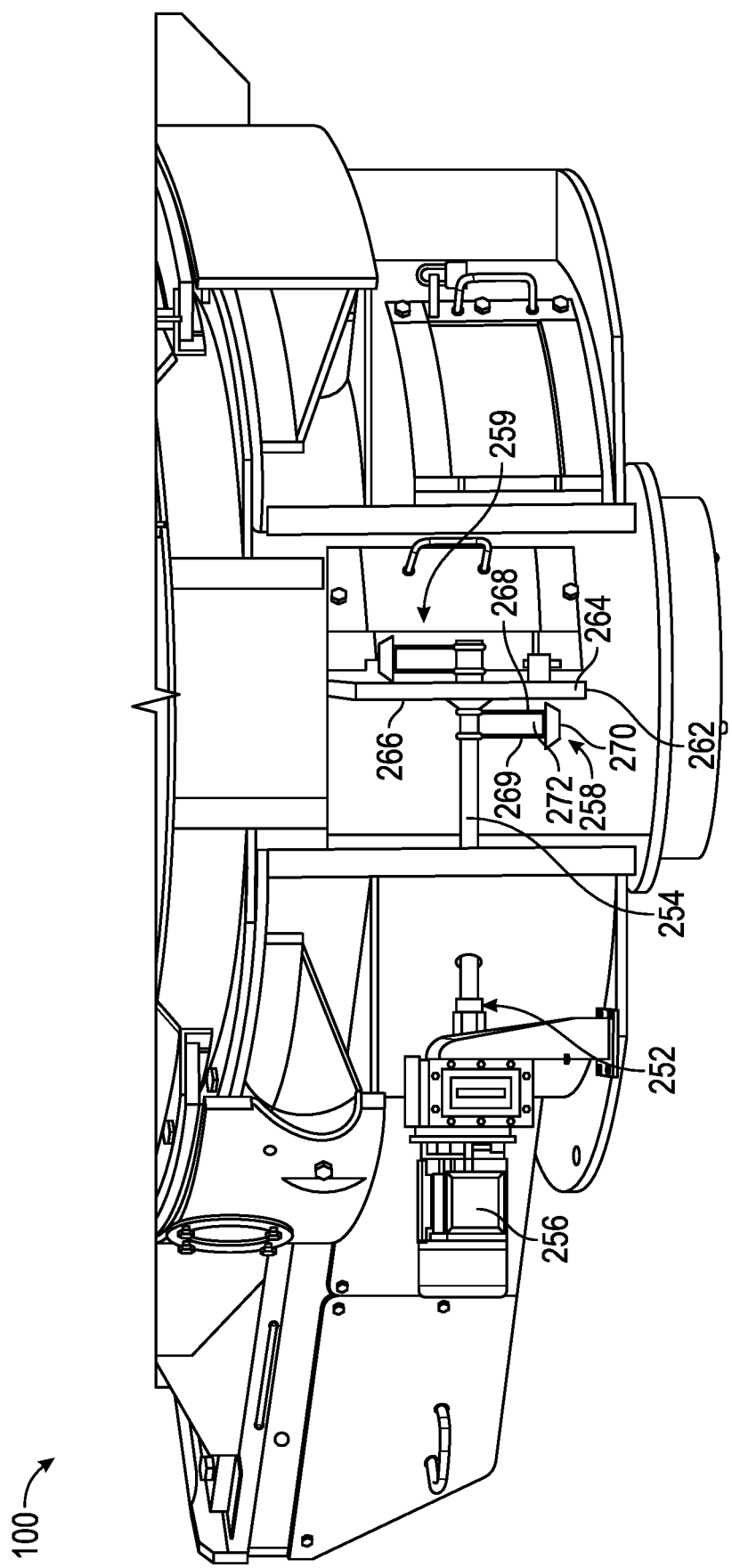
FIG. 14 depicts another perspective view of a portion of the centrifugal dryer with a section removed to show the cutting removal devices, according to an embodiment.

FIG. 14 depicts another perspective view of a portion of the centrifugal dryer 100 with a section removed to show the cutting removal device 250, according to an embodiment. In at least one embodiment, two or more arms (two are shown: 258, 259) may be coupled to the shaft 254. More particularly, the first arm 258 may be positioned on a first side of the plate 260 (e.g., proximate to the leading surface 264), and the second arm 259 may be positioned on a second side of the plate 260 (e.g., proximate to the trailing surface 266).

The first arm 258 may be rotationally-offset from the second arm 259 about the shaft 254 from about 90 degrees to about 270 degrees. As shown, the first arm 258 is rotationally-offset from the second arm 259 by about 180 degrees. In another embodiment, the first and second arms 258, 259 may be rotationally-aligned with one another.

Each arm 258, 259 may include first and second rods 268, 269. As shown, the rods 268, 269 may be parallel with one another and axially-offset from one another with respect to the shaft 254. A head 270 may be coupled to the ends of the rods 268, 269 that are distal from the shaft 254. Thus, openings 272 may be defined through the arms 258, 259 and be bounded by the shaft 254, the rods 268, 269, and the head 272.

The arms 258, 259 may rotate together with the shaft 254. As the arms 258, 259 rotate, the arms 258, 259 may scrape and remove any cuttings that have become stuck to the surfaces 264, 266 of the plate 262. This may prevent the cuttings from building up on the surfaces 264, 266 of the plate 262, which may reduce the amount of time that the centrifugal dryer 100 is offline to manually remove the cuttings from the plate.

Figure 15:
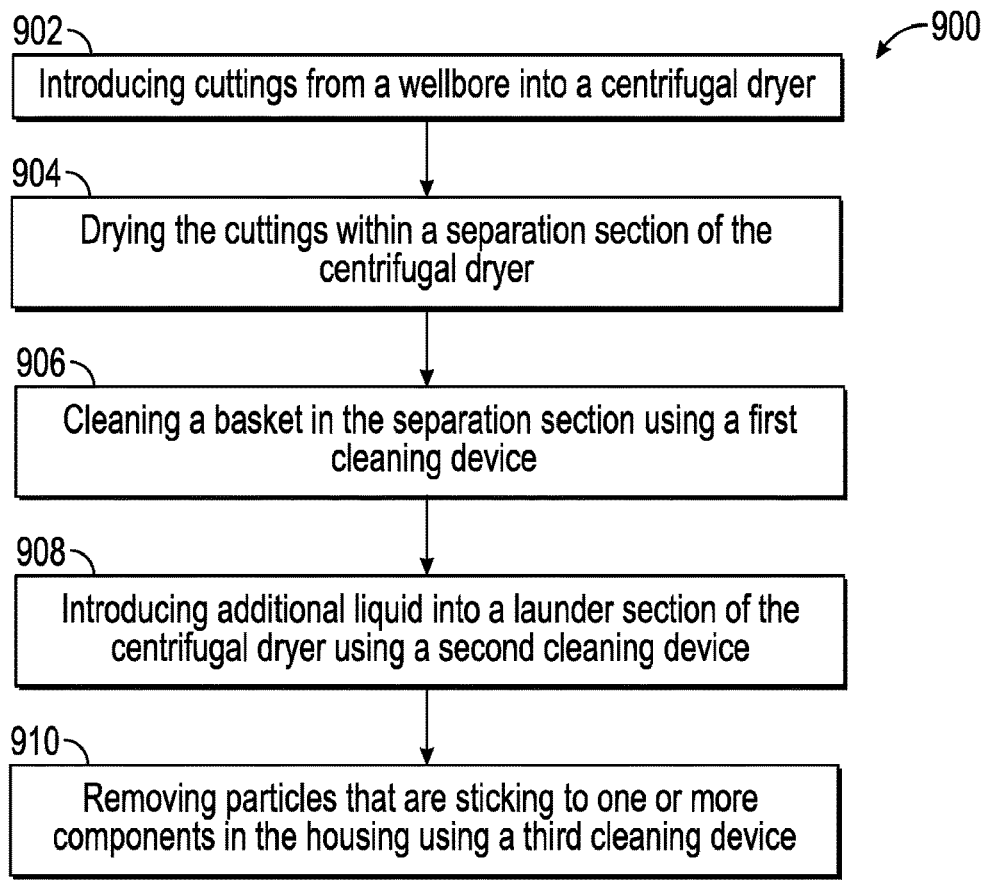
FIG. 15 depicts a flowchart of a method for drying cuttings from a wellbore, according to an embodiment.

FIG. 15 depicts a flowchart of a method 900 for drying cuttings from a wellbore, according to an embodiment. The method 900 may include introducing cuttings from the wellbore into the centrifugal dryer, as at 902. The method 900 may then include drying the cuttings within the separation section 116 of the centrifugal dryer 100, as at 904.

The cuttings may plug or clog at least a portion of the openings in the basket 132 as the cuttings are dried. As such, the method 900 may also include cleaning the basket 132 using a first cleaning device 150, as at 906. The rate of rotation of the basket 132 may be reduced during the cleaning of the basket 132. For example, when the basket 132 is being cleaned, the rate of rotation may be from about 0 RPM to about 100 RPM or from about 5 RPM to about 30 RPM. After the basket 132 has been cleaned, the rate of rotation may increase back to operational levels (e.g., from about 500 RPM to about 1500 RPM or from about 700 RPM to about 1000 RPM).

In at least one embodiment, the cleaning of the basket 132 may occur in response to a user command. For example, a user may press a button or turn a knob to cause the rate of rotation of the basket 132 to decrease and/or to cause the liquid to begin flowing into the first cleaning device 150. In another embodiment, the cleaning of the basket 132 may be on a timer. For example, the rate of rotation of the basket 132 may decrease and/or the liquid may begin flowing into the first cleaning device 150 once every hour of operation. In yet another embodiment, the cleaning of the basket 132 may occur in response to a measured parameter (e.g., moisture, torque, etc.) reaching or exceeding a predetermined threshold. For example, the centrifugal dryer 100 may include one or more moisture sensors positioned proximate to the outlet 170. When the sensors show that the moisture level in the cuttings is greater than or equal to a predetermined threshold, this may indicate that at least a portion of the openings in the basket 132 are plugged or clogged. In response to this, the rate of rotation of the basket 132 may be decreased, and/or the liquid may begin flowing into the first cleaning device 150. In another example, one or more sensors may measure the torque on the motor driving the basket 132. When the sensors show that the torque is greater than, less than, or equal to a predetermined threshold, this may indicate that at least a portion of the openings in the basket 132 are plugged or clogged. In response to this, the rate of rotation of the basket 132 may be decreased, and/or the liquid may begin flowing into the first cleaning device 150.

After being separated from the cuttings, the liquid may still contain fine particles that make the liquid viscous. As such, the method 900 may also include introducing additional liquid into the launder section 118 of the centrifugal dryer 100 using a second cleaning device 160, as at 908. The additional liquid may be introduced into the outer annulus 138 in the launder section 118 of the housing 110 using the second cleaning device 160. The additional liquid may be output from the second cleaning device 160 in the same direction that the liquid that has been separated from the cuttings is flowing. This may be clockwise or counterclockwise within the outer annulus 138. Combining the additional liquid with the liquid that is separated from the cuttings may reduce the viscosity of the liquid that is separated from the cuttings, which may facilitate the flow out of the housing 110 through the outlet 170.

In addition to increasing the viscosity of the liquid that is separated from the cuttings, the particles in the liquid may also stick or adhere to one or more stationary or rotating components in the centrifugal dryer 100. For example, the particles may stick or adhere one or more surfaces 190 in the outer annuls 138 of the launder section 118 of the housing 110. As such, the method 900 may also include removing particles that are sticking to one or more components within the housing 110 using a third cleaning device 180, as at 910. The third cleaning device 180 may be or include a scraper 182, or cutting removal device 250. As shown, the scraper 182 may be coupled to or integral with the cone 130, the basket 132, or a component that is coupled to and rotating with the cone 130 or the basket 132. As the cone 130 and/or the basket 132 rotate, the scraper 182 may scrape and remove particles that are positioned in its path.

Figure 16:
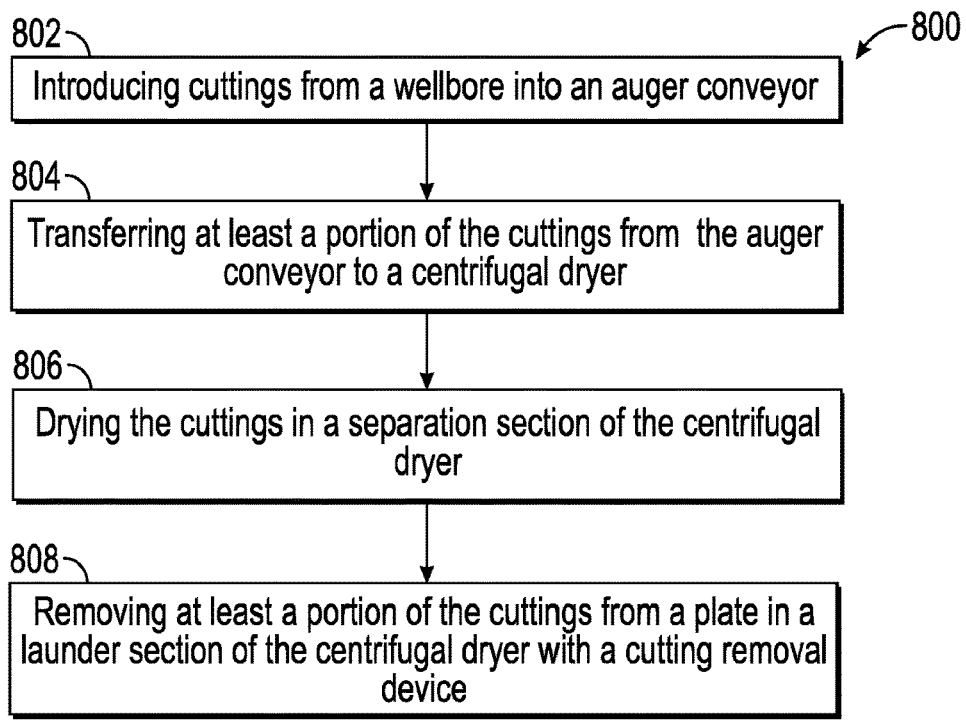
FIG. 16 depicts a flowchart of a method for drying cuttings from a wellbore, according to an embodiment.

FIG. 16 depicts a flowchart of a method 800 for drying cuttings from a wellbore, according to an embodiment. The method 800 may include introducing cuttings from the wellbore into the auger conveyor 200, as at 802. In at least one embodiment, the cuttings may first be at least partially dried by a shaker prior to being introduced into the auger conveyor 200.

The method 800 may then include transferring at least a portion of the cuttings from the auger conveyor 200 to the centrifugal dryer 100, as at 804. In at least one embodiment, two or more centrifugal dryers 100 may be coupled to the auger conveyor 200, and at least a portion of the cuttings from the auger conveyor 200 may be transferred to each of the two or more centrifugal dryers 100. In another embodiment, at least a portion of the cuttings from the auger conveyor 200 may bypass the centrifugal dryer 100 and be transferred into a storage container or location for the cuttings. This may occur when, for example, one or more moisture sensors in the shaker or auger conveyor 200 indicates that the cuttings are sufficiently dry such that they may bypass the centrifugal dryer 100.

The method 800 may then include drying the cuttings within the separation section 116 of the centrifugal dryer 100, as at 806. After the cuttings are dried in the separation section 116 of the centrifugal dryer 100, the cuttings may flow into a launder section 118 of the centrifugal dryer 100. In at least one embodiment, the cuttings may contact and stick to one or more plate 260, 262 in the launder section 118 of the centrifugal dryer 100.

The method 800 may then include removing at least a portion of the cuttings from the plate 260 in the launder section 118 of the centrifugal dryer 100 with the cutting removal device 250, as at 808. More particularly, the drive unit 256 may rotate the shaft 254. The arm 258 may be coupled to the shaft 254 and may rotate together with the shaft 254. The rotation of the arm 258 may scrape and remove the cuttings from the plate 260. In at least one embodiment, the shaft 254 may have two arms 258, 259 that are positioned on opposite sides of the plate 260, and the arms 258, 259 may both rotate together with the shaft 254 to scrape and remove the cuttings from both sides 264, 266 of the plate 260. The cuttings may then exit the centrifugal dryer 200 through the outlet 116.

In the method 800, particles in the liquid may also stick or adhere to one or more stationary or rotating components in the centrifugal dryer 100. For example, the particles may stick or adhere to one or more surfaces 190 in the outer annuls 138 of the launder section 118 of the housing 110. As such, the method 800 may also include removing particles that are sticking to one or more components within the housing 110 using a second scraping device 180. The second scraping device 180 may be or include a scraper 182. As shown, the scraper 182 may be coupled to or integral with the cone 130, the basket 132, or a component that is coupled to and rotating with the cone 130 or the basket 132. As the cone 130 and/or the basket 132 rotate, the scraper 182 may scrape and remove particles that are positioned in its path.

According to embodiments of the present disclosure, a centrifugal dryer may include a housing, a basket positioned within the housing, wherein the basket defines one or more openings formed laterally therethrough, wherein the basket is configured to rotate around a central longitudinal axis through the housing, and wherein an annulus is formed between the basket and the housing, and a cleaning device positioned within the annulus, wherein the cleaning device is configured to introduce a liquid into the annulus. The cleaning device may include a tube having a first outlet, wherein the first outlet directs the fluid toward the basket. The first outlet may include a nozzle that directs the fluid toward the basket as the basket is rotating. The tube may include a second outlet that is axially-offset from the first outlet along a length of the tube. The basket may be substantially frustoconical in shape, wherein a distance between the tube and the basket is substantially constant over at least a portion of a length of the tube. In some embodiments, the basket may be substantially frustoconical in shape, wherein a distance between the tube and the central longitudinal axis through the housing increases moving axially-away from an inlet of the housing. The basket may be configured to rotate from about 500 rotations per minute to about 1500 rotations per minute when the centrifugal dryer is drying cuttings, and wherein the basket is configured to slow down to about 0 rotations per minute to about 100 rotations per minute when the liquid is introduced into the annulus.

According to embodiments of the present disclosure, a centrifugal dryer may include a housing, a separation section of the housing comprising a cone and a basket positioned at least partially around the cone, wherein the cone and the basket are configured to rotate around a central longitudinal axis that extends through the housing, a launder section of the housing positioned below the separation section, and a cleaning device positioned at least partially in the launder section, wherein the cleaning device is configured to introduce a liquid into the launder section. The cleaning device may include a tube that extends through the housing at a first location. The tube may also extend through the housing at a second location that is circumferentially-offset from the first location with respect to the central longitudinal axis. In some embodiments, the cleaning device may include a first outlet positioned within the launder section, wherein the first outlet is configured to introduce the liquid into the launder section in a substantially circular flowpath around the central longitudinal axis. The circular flowpath may be in a same direction as the cone and the basket rotate. The cleaning device may further include a second outlet positioned within the launder section, wherein the second outlet is positioned radially-inward from the first outlet with respect to the central longitudinal axis. In some embodiments, the cleaning device further includes a second outlet positioned within the launder section, wherein the second outlet is positioned axially-above the first outlet with respect to the central longitudinal axis.

According to embodiments of the present disclosure, a centrifugal dryer may also include an outlet in the launder section of the housing that provides a path of fluid communication from the launder section to an exterior of the housing and a dam plate positioned in the launder section of the housing and downstream from the outlet with respect to a direction that the liquid flows. An upstream surface of the dam plate may be oriented at an acute angle with respect to an inner surface of the housing.

According to some embodiments, a centrifugal dryer may include a housing, a basket positioned within the housing, wherein the basket defines one or more openings formed laterally there through, and wherein the basket is configured to rotate around a central longitudinal axis through the housing, and a cleaning device coupled to the basket and configured to rotate therewith. The cleaning device may include a first scraper that is configured to scrape and remove particles that stick to a stationary surface in the housing. The first scraper may include one or more radially-extending surfaces and one or more axially-extending surfaces. The cleaning device may include a second scraper that is circumferentially-offset from the first scraper.

According to some embodiments, a centrifugal dryer may include a housing that defines an annulus therein, a first plate positioned within the annulus, and a first cutting removal device coupled to or extending through the first plate, wherein the first cutting removal device is configured to move to remove cuttings that stick to the first plate. The first plate may extend in a radial direction within the annulus with respect to a central longitudinal axis through the housing, wherein the cuttings are configured to move in a clockwise or counterclockwise direction around the central longitudinal axis, causing the cuttings to contact and stick to the first plate. The first cutting removal device may include a shaft that is configured to rotate around a central longitudinal axis that extends through the shaft. The shaft may extend at least partially through the housing, at least partially through the annulus, and at least partially through the first plate. The first cutting removal device may further include a first arm coupled to the shaft and configured to rotate with the shaft, wherein the first arm is configured to remove the cuttings that are sticking to the first plate as the first arm rotates with respect to the first plate. The first arm may include a first rod extending radially-outward from the shaft, a second rod extending radially-outward from the shaft, wherein the second rod is substantially parallel to the first rod, and a head coupled to the first and second rods, wherein an opening is formed through the first arm and bounded by the shaft, the first rod, the second rod, and the head. In some embodiments, the first cutting removal device may further include a second arm coupled to the shaft and configured to rotate with the shaft, wherein the first arm is positioned on a first side of the first plate and configured to remove the cuttings that stick to the first side of the first plate, and wherein the second arm is positioned on a second, opposing side of the first plate and configured to remove the cuttings that stick to the second side of the first plate. The first arm may be rotationally-offset about the shaft from the second arm.

According to embodiments of the present disclosure, a centrifugal dryer may further include a second plate positioned within the annulus and a second cutting removal device coupled to or extending through the second plate, wherein the second cutting removal device is configured to move to remove cuttings that stick to the second plate. The first and second cutting removal devices may each include a motor and a shaft extending from the motor, wherein the shaft of the first cutting removal device extends away from the motor of the first cutting removal device in a first direction in the annulus, and wherein the shaft of the second cutting removal device extends away from the motor of the second cutting removal device in a second, opposing direction in the annulus.

According to embodiments of the present disclosure, a centrifugal dryer may include a housing, a cone positioned within the housing and configured to rotate around a central longitudinal axis through the housing, a basket positioned within the housing and radially-outward from the cone with respect to the central longitudinal axis, wherein the basket defines one or more openings formed laterally there through, and wherein the basket is configured to rotate around the central longitudinal axis through the housing, a plate positioned within an annulus defined between the cone and the basket, and a cutting removal device coupled to or extending through the plate, wherein the cutting removal device is configured to move to remove cuttings that stick to the plate. The cone and the basket may be configured to cause the cuttings to rotate within the annulus around the central longitudinal axis, wherein the rotational movement of the cuttings causes the cuttings to contact and stick to the plate. The plate may be axially-offset from the cone and the basket with respect to the central longitudinal axis.

The cutting removal device may include a shaft that is configured to rotate around a central longitudinal axis that extends through the shaft. The shaft may extend at least partially through the housing, at least partially through the annulus, and at least partially through the first plate. The cutting removal device may further include a first arm coupled to the shaft and configured to rotate with the shaft, wherein the first arm is configured to remove the cuttings that are sticking to the plate as the first arm rotates with respect to the plate. The cutting removal device may further include a second arm coupled to the shaft and configured to rotate with the shaft, wherein the first arm is positioned on a first side of the plate and configured to remove the cuttings that stick to the first side of the plate, wherein the second arm is positioned on a second, opposing side of the plate and configured to remove the cuttings that stick to the second side of the plate, and wherein the first arm is rotationally-offset about the shaft from the second arm.

According to embodiments of the present disclosure, a method for drying cuttings from a wellbore may include introducing the cuttings from the wellbore into an auger conveyor, transferring at least a portion of the cuttings from the auger conveyor to a centrifugal dryer through a first outlet in the auger conveyor, drying the cuttings within the centrifugal dryer, wherein at least a portion of the cuttings are configured to stick to a plate in the centrifugal dryer after being dried, and wherein the centrifugal dryer comprises a cutting removal device, and removing at least a portion of the cuttings from the plate using the cutting removal device. The cutting removal device may include a shaft that is coupled to the plate or extends at least partially through the plate and an arm that extends radially-outward from the shaft, wherein removing the at least a portion of the cuttings from the plate with the cutting removal device comprises rotating the shaft and the arm with a motor. The method may further include causing at least a portion of the cuttings to bypass the first outlet when a sensor indicates that the at least a portion of the cuttings are sufficiently dry.

When introducing elements of various embodiments of the present disclosure, the articles "a," "an," and "the" are intended to mean that there are one or more of the elements. As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

Although the preceding description has been described herein with reference to particular means, materials, and embodiments, it is not intended to be limited to the particulars disclosed herein; rather, it extends to all functionally equivalent structures, methods, and uses, such as are within the scope of the appended claims.

The invention claimed is:

1. A centrifugal dryer, comprising:
    a housing;
    a separation section of the housing comprising a cone and a basket positioned at least partially around the cone, wherein the cone and the basket are configured to rotate around a central longitudinal axis that extends through the housing;

a launder section of the housing positioned below the separation section;
an annulus formed between the basket and the housing and extending through the separation section and the launder section; and
a cleaning device configured to direct fluid through the annulus to clean the centrifugal dryer,
wherein the cleaning device is positioned at least partially in the launder section,
wherein the cleaning device is configured to introduce the fluid into the launder section, and
wherein the cleaning device comprises a tube that extends through the housing at a first location and also extends through the housing at a second location that is circumferentially-offset from the first location with respect to the central longitudinal axis.

2. The centrifugal dryer of claim 1, wherein the cleaning device comprises a first outlet positioned within the launder section, and wherein the first outlet is configured to introduce the fluid into the launder section in a substantially circular flowpath around the central longitudinal axis which is the same direction as the cone and the basket rotate.

3. The centrifugal dryer of claim 2, wherein the cleaning device further comprises a second outlet positioned within the lander section, and wherein the second outlet is positioned radially-inward or axially-above the first outlet with respect to the central longitudinal axis.

4. The centrifugal dryer of claim 2, further comprising:
an outlet in the launder section of the housing that provides a path of fluid communication from the launder section to an exterior of the housing;
a dam plate positioned in the launder section of the housing and downstream from the outlet with respect to a direction that the fluid flows; and
an upstream surface of the dam plate oriented at an acute angle with respect to an inner surface of the housing.

5. The centrifugal dryer of claim 1, further comprising:
a second cleaning device positioned in the separation section and comprising a first outlet that directs the fluid toward the basket as the basket is rotating.

6. The centrifugal dryer of claim 5, wherein the second cleaning device is positioned in the annulus in the separation section and comprises a tube having the first outlet, and wherein the first outlet comprises a nozzle that directs the fluid toward the basket as the basket is rotating.

7. The centrifugal dryer of claim 6, wherein the tube of the second cleaning device comprises a second outlet that is axially-offset from the first outlet along a length of the tube of the second cleaning device.

8. The centrifugal dryer of claim 6, wherein the basket is substantially frustoconical in shape, and wherein a distance between the tube of the second cleaning device and the basket is substantially constant over at least a portion of a length of the tube of the second cleaning device.

9. The centrifugal dryer of claim 5, wherein the basket is configured to rotate from about 500 rotations per minute to about 1500 rotations per minute when the centrifugal dryer is drying cuttings, and wherein the basket is configured to slow down to about 0 rotations per minute to about 100 rotations per minute when the liquid is introduced into the annulus.

10. The centrifugal dryer of claim 5, further comprising at least one scraping device.

11. The centrifugal dryer of claim 10, wherein the at least one scraping device comprises:
a first scraper that is coupled to the basket and configured to rotate therewith.

12. The centrifugal dryer of claim 10, wherein the at least one scraping device comprises at least one cutting removal device coupled to or extending through a first plate within the annulus, wherein the at least one cutting removal device is configured to rotate to remove cuttings that stick to the first plate.

13. The centrifugal dryer of claim 1, further comprising at least one scraping device.

14. A centrifugal dryer, comprising:
a housing;
a basket positioned within the housing, wherein the basket defines one or more openings formed laterally there through, wherein the basket is configured to rotate around a central longitudinal axis through the housing, and wherein an annulus is formed within the housing; and
at least one scraping device disposed within the housing and configured to scrape and remove particles that stick to a stationary surface in the housing, wherein the at least one scraping device comprises at least one cutting removal device coupled to or extending through a first plate within the annulus, wherein the at least one cutting removal device is configured to rotate to remove cuttings that stick to the first plate.

15. The centrifugal dryer of claim 14, wherein the at least one scraping device further comprises:
a first scraper that is coupled to the basket and configured to rotate therewith.

16. The centrifugal dryer of claim 15, wherein the first scraper comprises one or more radially-extending surfaces and one or more axially-extending surfaces.

17. A centrifugal dryer, comprising:
a housing that defines an annulus therein;
a cone positioned within the housing and configured to rotate around a central longitudinal axis through the housing;
a basket positioned within the housing and radially-outward from the cone with respect to the central longitudinal axis, wherein the basket defines one or more openings formed laterally there through, and wherein the basket is configured to rotate around the central longitudinal axis through the housing;
a first plate positioned within the annulus; and
a first cutting removal device coupled to or extending through the first plate, wherein the first cutting removal device is configured to move to remove cuttings that stick to the first plate.

18. The centrifugal dryer of claim 17, wherein the first plate extends in a radial direction within the annulus with respect to a central longitudinal axis through the housing, and wherein the cuttings are configured to move in a clockwise or counterclockwise direction around the central longitudinal axis, causing the cuttings to contact and stick to the first plate.

19. The centrifugal dryer of claim 17, wherein the first cutting removal device comprises:
a shaft that is configured to rotate around a central longitudinal axis that extends through the shaft; and
a first arm coupled to the shaft and configured to rotate with the shaft to remove the cuttings that are sticking to the first plate as the first arm rotates with respect to the first plate.

20. The centrifugal dryer of claim 19, wherein the shaft extends at least partially through the housing, at least partially through the annulus, and at least partially through the first plate.

* * * * *